United States Patent [19]

Cobb et al.

[11] 4,250,975
[45] Feb. 17, 1981

[54] CAB MOUNTING FOR MINING MACHINE

[75] Inventors: William R. Cobb, Murrysville; Henry P. Barthe, Pittsburgh, both of Pa.

[73] Assignee: Schroeder Brothers Corporation, McKees Rocks, Pa.

[21] Appl. No.: 30,218

[22] Filed: Apr. 16, 1979

[51] Int. Cl.³ ............... B62D 33/06; B62D 33/08
[52] U.S. Cl. .................... 180/89.13; 175/219; 405/290; 405/291
[58] Field of Search .......... 180/77 S, 77 MC, 77 C, 180/89.13, 14 R; 173/23; 299/10; 405/290, 291; 175/219

[56] References Cited

U.S. PATENT DOCUMENTS

| 2,670,987 | 3/1954 | Walsh | 180/89.13 X |
| 3,315,758 | 4/1967 | Allen | 180/89.13 X |
| 3,951,215 | 4/1976 | Galis | 299/10 |
| 4,065,167 | 12/1977 | Wright | 180/77 MC |

Primary Examiner—John A. Pekar
Attorney, Agent, or Firm—Webb, Burden, Robinson & Webb

[57] ABSTRACT

A system for mounting two operator cabs to a vehicle chassis for transverse extension. At least one large tube is mounted to the vehicle with its axis pointed in the direction of the operator cab movement. Two smaller tubes of different diameters telescopically engage the large tube and each other and project at opposite ends of the large tube. A bushing is fixed in the opening of the large tube from which the smallest tube extends. Two cab brackets slidably engage the outer surface of the large tube. An outer edge of each cab bracket is fixed relative to one of the smaller tubes which is a cantilever support therefor when the cab is extended outwardly of the length of the large tube. The cabs are slidably mounted to the cab brackets for vertical movement relative thereto.

6 Claims, 6 Drawing Figures

CAB MOUNTING FOR MINING MACHINE

BACKGROUND

This invention relates to a system for securing two operator cabs to the front of a mining vehicle for independent transverse movement as well as up-down movement. It has particular application to our roof bolting and drilling apparatus as disclosed in our co-pending application filed of even date herewith entitled "Roof Bolting Device" bearing Ser. No. 030,219.

Vertically adjustable operator cages mounted to mining vehicles are known. (See U.S. Pat. No. 4,065,167). Also, it has been suggested that certain drill pod carriages and operator cabs be adjustable laterally relative to the chassis by means involving fixed beams extending transversely of the chassis. In those instances of which the applicants' are aware, the transverse beams are positioned under the front, back and middle of the cabs and carriages (see U.S. Pat. No. 3,951,215).

It is an advantage according to this invention to provide a system for securing two operator cabs that may be independently moved both transversely and vertically relative to the vehicle chassis. It is a further advantage that each cab can be extended to its outermost transverse position simultaneously. It is a still further advantage that when each cab is withdrawn to its innermost transverse position, no fixed beam or other apparatus extends outwardly transversely of the chassis. Further, there is no requirement for plurality of adjustable stabilizing jacks secured to the cab as it can be brought to rest upon the mine floor. It is a still further advantage that both cabs are mounted to the front end of the chassis ahead of the frame supporting the said chassis. Thus the cabs project forward away from the chassis with no apparatus between the cabs and the mine floor.

BRIEF DESCRIPTION OF THE INVENTION

This invention relates to a means for mounting two cabs to a mining machine. The mining machine typically comprises a chassis defining a base generally parallel to the ground. At least one large diameter tube is mounted to the chassis parallel to the base and transverse to the longitudinal axis of the chassis. The large tube extends substantially the width of the chassis but no further. The large tube has a first open end and a second open end with a bushing position in the second open end to restrict the size of the opening. A medium diameter tube coaxial with the large diameter tube extends outwardly of the first large open end. A small diameter tube coaxial with the large and medium diameter tubes extends outwardly of the second end through said bushing. The large, medium and small diameter tubes telescope one over the other. The inner and outer diameters of the tubes and the inner diameter of the bushing are sized such that facing surfaces are in sliding engagement. The length of the medium and small tubes is less than the length of the large tube but long enough so that when both are at the outermost extension (as explained hereafter), they still interengage within the large tube. The longer the medium and small tubes the better—for the engagement therebetween will be increased as their respective lengths are increased. Two cab support brackets, each having one partially cylindrical arm which slides over the outer surface of the large tube are secured at an outer edge thereof to one of the smaller tubes which acts as a cantilever support therefor when a cab is extended outwardly of the width of the chassis. Hydraulic means (pistons and cylinders) secured to the chassis at one end and to the cab support brackets at the other to move the brackets in and out when actuated.

According to a preferred embodiment, each cab support bracket has at least one vertical track and one end of a vertically extensible hydraulic means secured thereto such that a cab may slidably engage the vertical track and be vertically positioned by the extensible hydraulic means the other end of which is secured to the cab.

DRAWINGS

Further features and other objects and advantages of the invention will become clear from the following detailed description made with reference to the drawings, in which FIG. 1 is a schematic perspective view of roof drilling and bolting device having two independently operable front mount cabs for which the cab mounting system according to this invention may be used, FIG. 2 is a partial plane view of the device shown in FIG. 1 showing the cabs at two alternate positions, FIG. 3 is a front section taken along lines III—III in FIG. 2, FIG. 4 is a front section taken along lines IV—IV of FIG. 2, FIG. 5 is an undimensioned schematic relating to a front section taken along lines V—V of FIG. 2, and FIG. 6 is a side elevation.

DESCRIPTION OF THE PREFERRED EMBODIMENTS

Figure 1:
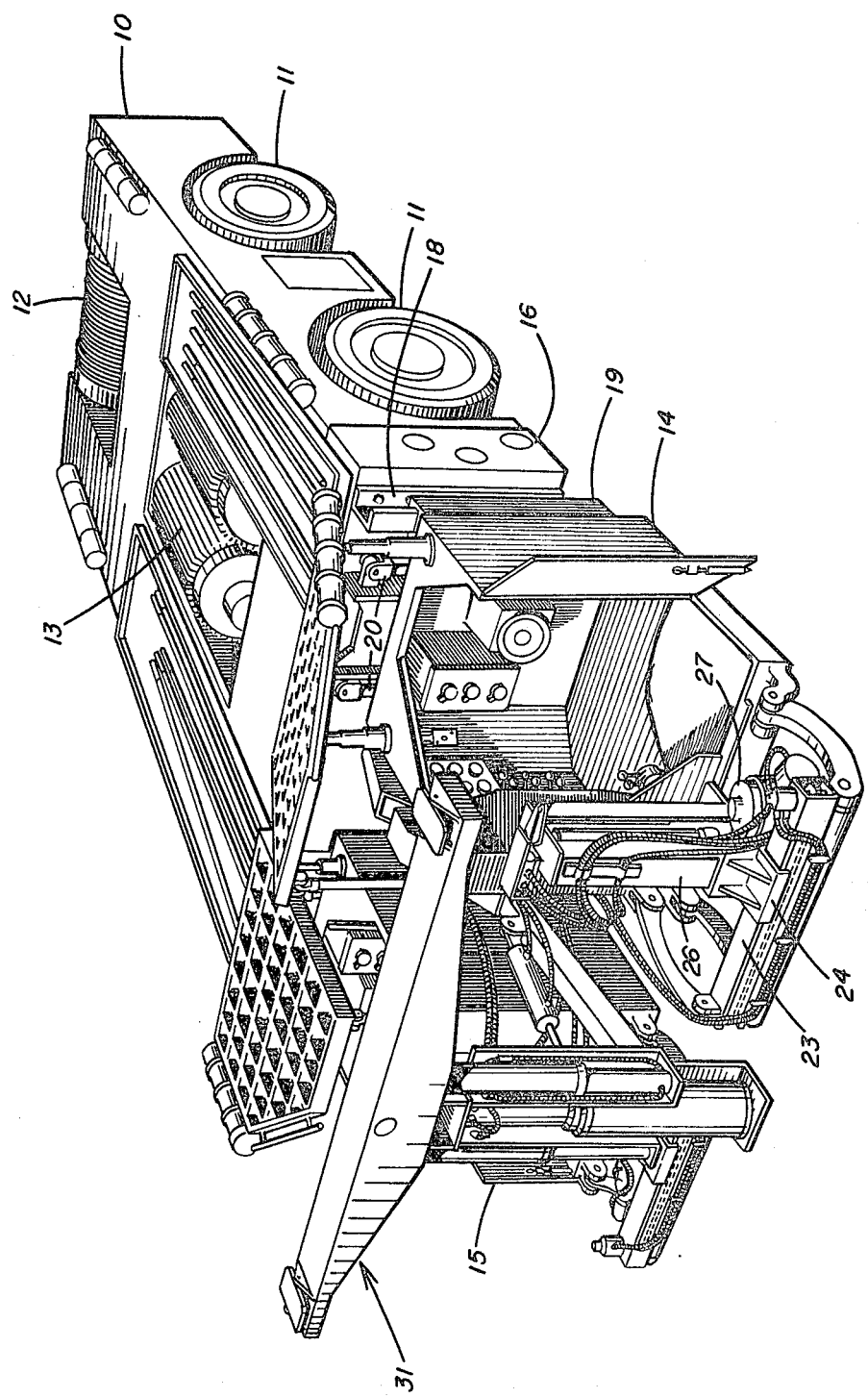

FIG. 1 is a perspective of a preferred embodiment of this invention. The roof drilling and bolting device comprises a movable chassis 10 having a base generally parallel to the mine floor supported, for example, by four individually driven wheels 11. The chassis has a main electrical cable reel 12 mounted with a horizontal axis at the rear of the chassis. In the center of the chassis are two electric motors which drive the hydraulic pumps that provide hydraulic power to the entire device. The cabs 14 and 15 are mounted to the front of the chassis. The interface between the cabs 14 and 15 and the chassis 10 comprises two cab support brackets 16 (only one clearly shown in FIG. 1) which are positionable transversely of the chassis 10 by hydraulic extensible devices (pistons and cylinders). Cab support brackets 16 support vertical tracks 18 which slidably engage the runners 19 fixed to the cab. Extensible hydraulic devices (pistons and cylinders) 20 move each cab vertically relative to the cab support bracket to which it is fixed. Each cab may be raised or lowered and each cab may be moved transversely.

A planographically mounted horizontal track 23 extends the length of each cab along the front edge of the floor thereof. A carriage 24 is mounted on the track 23 and is hydraulically moved side to side. Upright tower 26 is mounted on the carriage 24. Associated with each upright tower 26 is a drill pod 27 for receiving drill steel and roof bolts. Extensible hydraulic means raise and lower the drill pods relative to the upright tower 26. A temporary roof support 31 extends in front of the two cabs 14 and 15.

Figure 2:
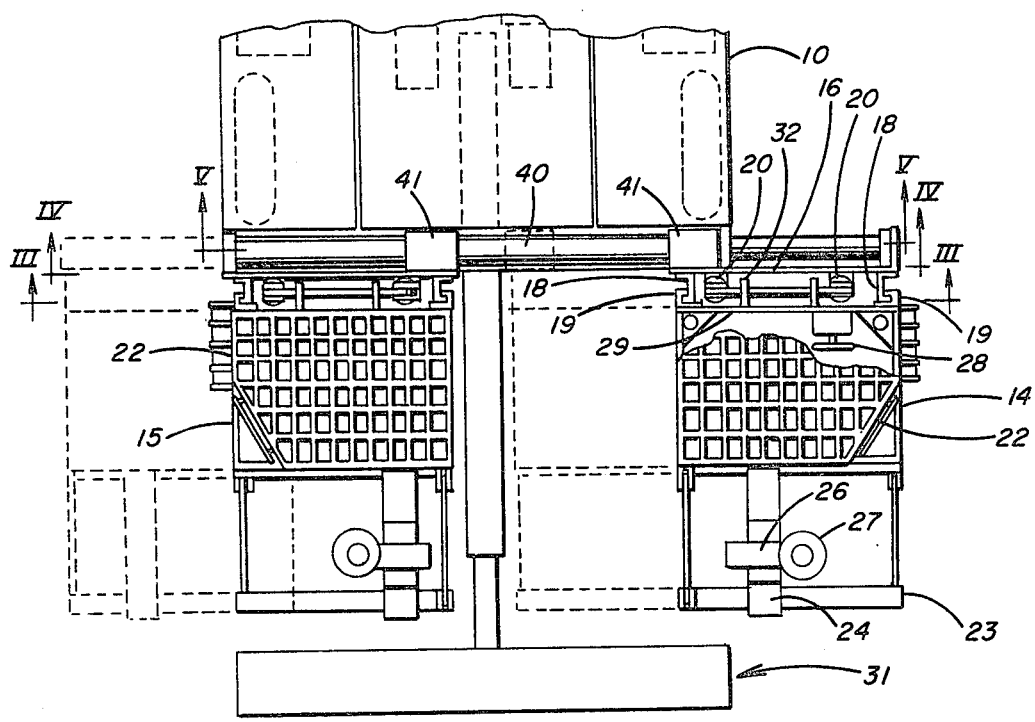

Referring now to FIG. 2, a plane view of the chassis and cabs 14 and 15 is illustrated with the cab 14 at its outermost extension and the cab 15 at its innermost position relative to the center line of the chassis 10. The entire canopy 22 is shown over cab 15. The canopy over cab 14 is shown broken away to show the steering control and the backwall of the cab 14. The cab bracket 16 and vertical tracks 18 fixed thereto are shown on end engaging runner 19 fixed to the cab. An end view of the extensible hydraulic means 20 for raising and lowering the cab is also observable.

Figure 3:
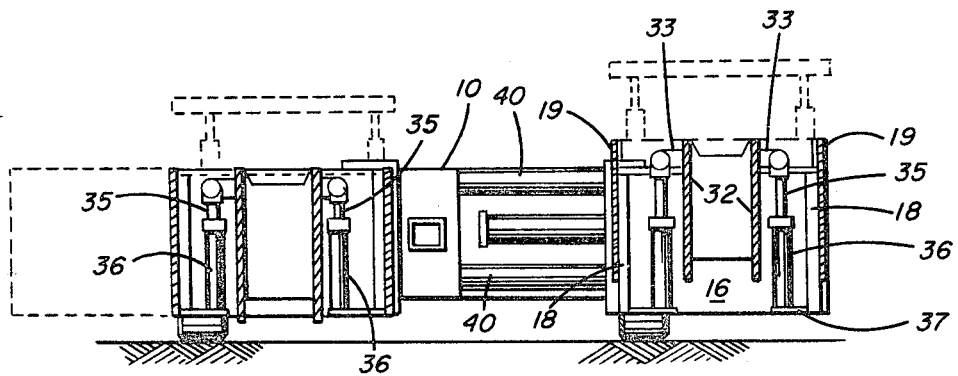

Referring now to FIG. 3, the front of the chassis 10 is shown sectioned through the runner 19 fixed to the cab. Flanges 32 extending from the back 29 of the cab are also shown sectioned. The purpose of the flanges 32 is to provide hangers 33 to which the piston of hydraulic cylinder 36 may be secured. The bottom of the piston 36 is fixed to a foot flange 37 secured to the cab bracket 16. Thus expansion of the piston 35 and cylinder 36 combination results in the raising of the cab relative to the cab bracket. The sectioned portions of the cab shown on the left-hand side of FIG. 3 are in a lower position than those on the right-hand side due to the lesser extension of the extensible hydraulic means comprising the piston and cylinder 35, 36.

Figure 4:
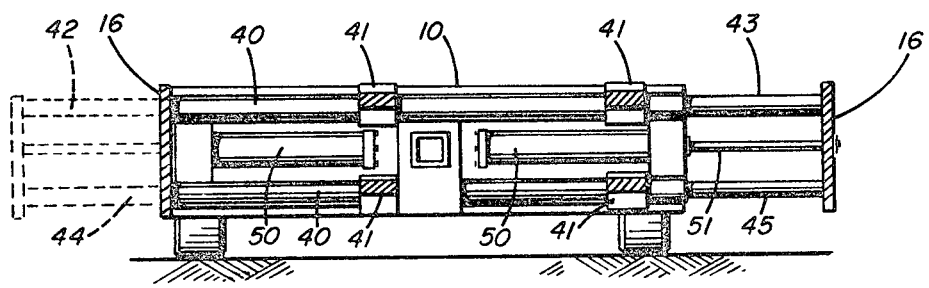

Referring now to FIG. 4, the front face of the chassis 10 is shown with two large diameter tubes 40 mounted parallel to each and spaced apart and parallel to the base of the chassis 10. These tubes are fixed to the frame and extend the entire width of the chassis. The cab bracket 16 is secured at its innermost edge to cylindrical arms 41. The cylindrical arms 41 slide over the outer surface of the large diameter tubes 40. The inner cylindrical surface may preferably be lined with a bronze shoe.

A medium diameter tube 43 and a small diameter tube 42 are telescoped within the upper large diameter tube 40. A medium diameter tube 44 and a small diameter tube 45 are telescoped within the lower large diameter tube 40. The outer edge of each cab bracket 16 is secured to tubes extending out of the large diameter tube on the adjacent side of the vehicle. All of the small tubes (including the medium diameter and small diameter tubes) 42, 43, 44, and 45 extend approximately the entire width of the chassis and, in any event, interengage even when both cab brackets are extended to their maximum outward reach. Hydraulic cylinder 50 and associated piston 51 are secured on one end to the front face of the chassis 10 and at one end to the cab bracket for hydraulically actuating the cab movement transverse of the chassis.

Figure 5:
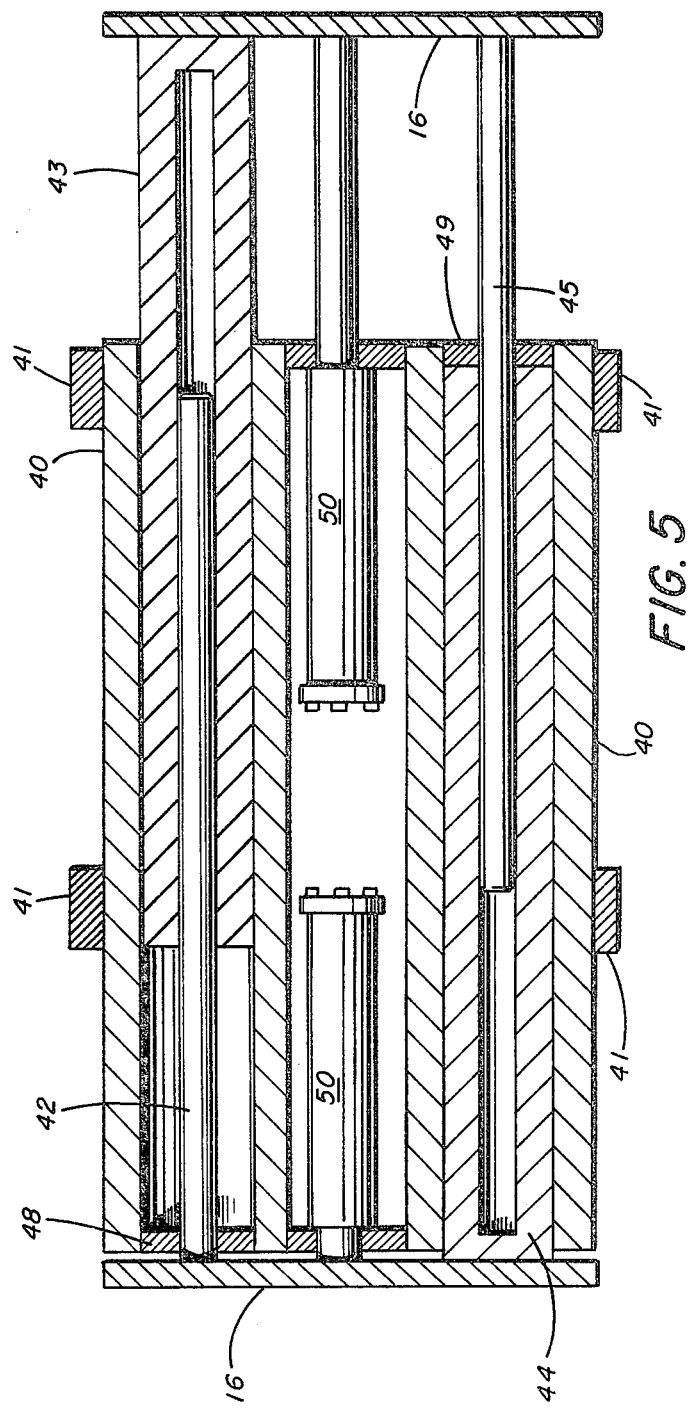

Referring to FIG. 5, which is an undimensioned schematic of a section through the small, medium and large tubes, it can be seen that the three tubes are telescoped together. In the case of the top large tube 40 there is shown at the left a bushing 48 having the same inner diameter of the medium size tube. The bushing is fixed to the inner diameter of the large tube 40. Similarly, a bushing 49 is placed at the right-hand end of the lower large diameter tube. All of the tubes and bushings have inner and outer diameters sized so that they will slidably engage each other. It should be noted that the right-hand cab bracket 16 is secured to one medium diameter tube and one small diameter tube. Likewise, the left-hand cab bracket is secured to one medium diameter tube and one small diameter tube.

Figure 6:
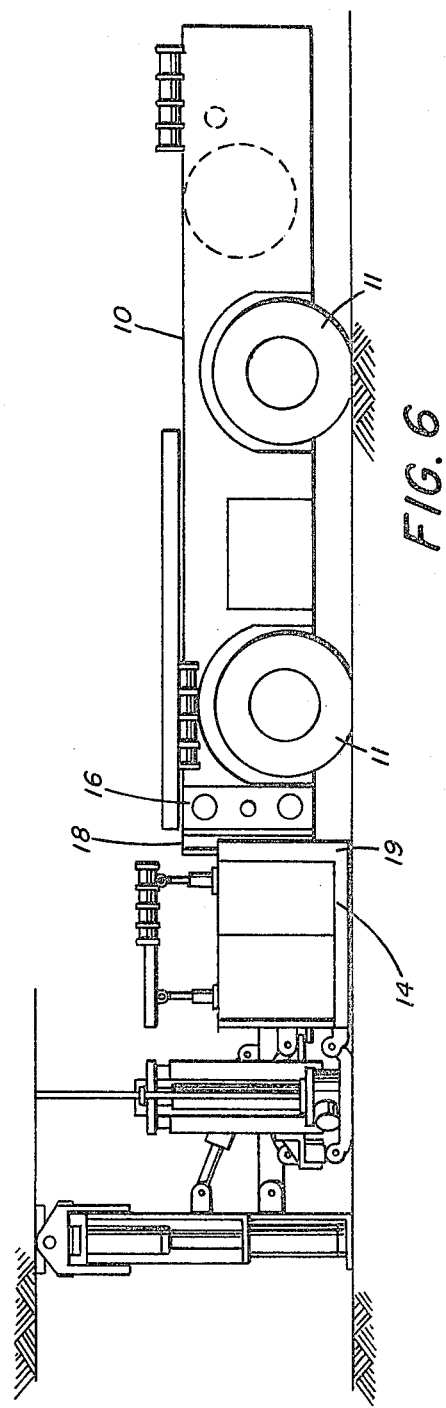

The side view in FIG. 6 illustrates the cab set in its lowermost position upon the mine floor as a result of the retraction of pistons 35 into cylinders 36.

OPERATION

During tramming of the chassis 10, pistons 51 are withdrawn into cylinders 50 thereby drawing the cab brackets 16 to their innermost position. The pistons 35 are extended somewhat out of the cylinders 36 to hold the cab up off the mine floor. Upon reaching desired drilling and bolting location, the two cabs can be moved relative to the chassis 10. Extension of the pistons 51 out of the cylinders 50 will push the cabs outwardly. The cab brackets secured to the outer surface of the two large tubes 40 by cylindrical arms 41 cannot twist away from the face of the chassis 10. The small cylinders 42 through 45 secured to the outer edges of the cabs provide cantilevered support for the cabs when extended outwardly of the chassis.

Having thus defined our invention with the particularity required by the Patent Office, what is desired protected by Letters Patent is set forth in the following claims:

1. In a mining machine or the like having a chassis defining a base generally parallel to the mine floor, means for mounting two cabs which can be independently and transversely extended outside the nominal width of the chassis comprising:

at least one larger diameter tube mounted to said chassis parallel to the base of the chassis and transverse thereto, said large tube extending substantially the width of the said chassis, said large tube having a first open end and a second open end with a bushing positioned therein, one medium diameter tube coaxial with the large diameter tube and having an exposed end extending outwardly of said first large open end, one small diameter tube coaxial with said large and medium diameter tubes and having an exposed end extending outwardly of said second end through said bushing, the large, medium and small diameter tubes being telescoped one over the other, the inner and outer diameters of said tubes and the bushing being such that facing surfaces are in sliding engagement, the length of said medium and small tubes being less than the length of the large tube but long enough so that when both are at their outermost extension they still interengage, two cab supporting brackets each having at least one partially cylindrical arm which slides over the outer surface of the large tube, one cab bracket being secured to the exposed end of the small diameter tube and the other cab bracket being secured to the exposed end of the medium diameter tube, first extensible hydraulic means attached at one end to one cab bracket and at another end to the chassis and second extensible hydraulic means attached at one end to said other cab and at another end to the chassis, whereby independent extension of said first and second extensible means provides for the independent transverse extension of said cab brackets.

2. Cab mounting means according to claim 1 wherein two large diameter tubes are mounted parallel to each other and each large diameter tube has associated therewith medium and small tubes.

3. Cab mounting means according to claim 2 wherein the first open ends of the two large tubes open in opposite directions.

4. Cab mounting means according to claim 2 wherein the two extensible hydraulic means are positioned between the two large diameter tubes and are parallel thereto.

5. Cab mounting means according to claims 2, 3 or 4 wherein the cab supporting brackets each have at least two partially cylindrical arms sliding over the outer surface of different large diameter tubes respectively.

6. Cab mounting means according to claims 1 or 2 wherein the cab brackets each support at least one vertical track and one end of a vertically extensible hydraulic means, whereby the cab may slidably engage the vertical track and be vertically positioned by the vertically extensible hydraulic means.

* * * * *